Nov. 11, 1969  T. W. GLYNN ET AL  3,477,836
PROCESS FOR PRODUCING DECORATIVE GLASS
Filed Nov. 18, 1965
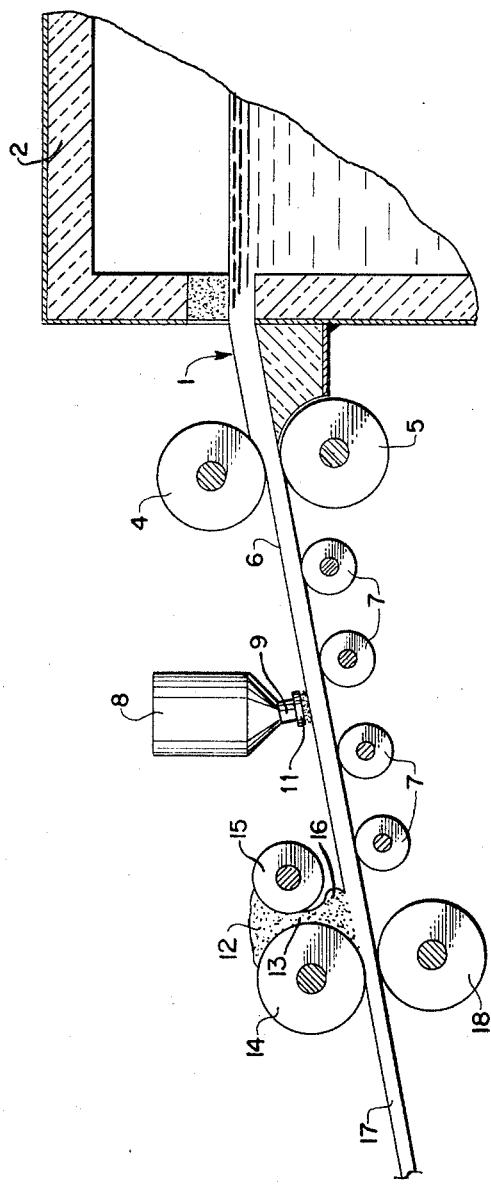
INVENTORS
THEODORE W. GLYNN
JACK S. STORM JR.
BY Pennie, Edmonds,
Morlan, Taylor & Adams
ATTORNEYS

United States Patent Office 3,477,836
Patented Nov. 11, 1969

3,477,836
PROCESS FOR PRODUCING DECORATIVE GLASS
Theodore W. Glynn and Jack S. Storm, Jr., Kingsport,
Tenn., assignors to American Saint Gobain Corporation, Kingsport, Tenn., a corporation of Delaware
Filed Nov. 18, 1965, Ser. No. 508,507
Int. Cl. C03b 13/10, 17/02; B32b 17/06
U.S. Cl. 65—121                          1 Claim

ABSTRACT OF THE DISCLOSURE

The method of forming a decorative flat glass comprising the steps of rolling a bottom sheet of glass along a path, applying a decorative material to the upper surface of the bottom sheet of glass, applying a body of glass to the upper surface of the bottom sheet of glass, incorporating the decorative material in the body of the glass, and rolling the body of glass and bottom sheet together to form a sandwiched flat glass.

---

This invention relates to the production of decorative flat glass containing decorative material formed of a bottom sheet of glass and a top sheet of glass rolled into a composite product or sandwich having various decorative effects. The invention provides an efficient and practical method of producing such flat glass with a greatly increased yield due to less breakage.

Many proposals and attempts have been made heretofore to produce decorative flat glass by rolling together two or more sheets of molten glass and interposed decorative objects but these have not been commercially practical due to high breakage. The material that forms the decorative portion of the glass is fed between the two sheets which are rolled together in an operation similar to the production of mesh wired glass. When this technique is practiced, the decorative material, whether it be a solid or bubble-forming material, acts as a foreign body or impurity. In either case, the sheet is non-homogenous, has strains and is weaker, resulting in breakage in annealing and handling. The break origins are usually at the edges of the sheet where open bubbles or foreign bodies cause checks that open in tension as the sheet is cooled. This breakage is due to the practical necessity of confining the decorative material to the top sheet and it is this sheet containing the crack-forming materials which has resulted in such high breakage that the production has been unprofitable.

This invention is based on our discovery that by rolling the top sheet which contains the decorative materials narrower than the bottom sheet, there are no such materials in the edges of the resulting sandwich flat glass which can cause edge cracks. The rolling operation and adding of the decorative materials are controlled to provide most if not all such materials in the top sheet.

In a preferred operation of the invention a bottom sheet is formed by passing molten glass between sizing rollers from which it is passed over the usual conveyer rollers to a position where the top sheet is applied. The top sheet is formed by flowing a curtain of molten glass onto the previously formed bottom sheet in front of a second set of sizing rollers. The molten glass forms a miniscus called a "bolster" in front of the top sizing roller and the bolster rolls or rotates in front of the top roller. By any suitable means the decorative material is applied on the upper surface of the bottom sheet near the bolster. The bolster then picks up and encapsulates the decorative material which was fed onto the bottom sheet. Thus, the material is incorporated in the rotating glass bolster in front of the top sizing roller and by adjustment of the width of the falling curtain of glass and the rate of flow, the width of the top sheet can be controlled. The preferred width of the top sheet is approximately one inch narrower on each side than the bottom sheet but a smaller margin can be used up to a critical point, say, about one-quarter inch inward of the bottom sheet whereby the bottom sheet extends beyond the top sheet along both edges.

Various decorative materials may be used, such as bubble-forming substances, colorants applied to produce the same or different colors or patterns, and metallic flakes or frits, to produce unique decorative flat glasses. The materials may be applied by means of sprays, vibratory feeders, solids metering devices or any other device which will apply the material in a uniform desired amount.

With respect to colorants, these may be applied by mixing the proper amount of colorant with a dry material that produces the decorative pattern and feeding as described above. This is the preferred method, but other methods of adding color may be used, such as spraying the bottom sheet with a colored glass enamel or frit or solutions of metallic salts, such as iron or tin chlorides. Flame or plasma spraying of colored frits, compounds, or metals can also be utilized.

We have made the important further discovery that anhydrous sodium metasilicate with an average composition of 51% $Na_2O$, 46.5% $SiO_2$ and 0.5% water, the balance being unidentified impurities, produces the desired bubbles in the sheet glass. A product fulfilling the requirements is manufactured by Philadelphia Quartz Company and sold under the trade name Metso Anhydrous. In order to produce the type and distribution of bubbles to obtain the desired effect, the anhydrous sodium metasilicate should be in a granular form, preferably in the form of particles ranging between 10 and 65 mesh. The anhydrous sodium metasilicate which is normally a clear glass can be colored with the usual additives for coloring glasses while in its molten state and then cooled, crushed and screened. The anhydrous sodium metasilicate may also be remelted, the colorants added followed by cooling, crushing and screening. The coloring matter may be in the form of colored frit or other inorganic material known to color molten glass.

The accompanying drawing illustrates more or less diagrammatically in side elevation an arrangement of apparatus for practicing the invention.

Molten glass 1 from the furnace 2 flows between the sizing rollers 4 and 5 to produce a bottom sheet of glass 6 having a carefully controlled thickness and width. The sheet of glass is supported on the conveyor rollers 7 and may be directed downward at any desired incline. A hopper 8 is mounted above the sheet of glass 6 for providing a supply of particulate decorative material, for example, granular anhydrous sodium metasilicate. The hopper may be provided with a rotary air lock or vibrating screen with adjustable baffles to feed the material into an air stream. The particle loaded air stream is passed to a distributing box 9 extending almost over the entire width of sheet 6 (not over the edges) to apply a regulated amount of decorative material 11. Other devices that are known for sprinkling or dusting granular materials may be used. When it is desired to apply the decorative material as liquid solution or suspension, then it may be applied with spraying equipment.

The body of glass 12, preferably supplied from furnace 2 as by means of a U-shaped channel (not shown) is fed in the form of a curtain 13 between the top sizing roller 14 and the feed roller 15 which forms the meniscus or bolster 16 on the bottom sheet 6. This bolster rolls or rotates in front of the sizing roller 14 and picks up and encapsulates the decorative material which has been fed onto the sheet 6 from the hopper 8. The glass from the bolster is drawn under the top sizing roller 14 to become the top sheet 17 which together with sheet 6 are sandwiched together and rolled to the required thickness between the second set of sizing rollers 14 and 18.

The following examples are illustrative of operations carried out in accordance with the invention:

EXAMPLE 1

A glass rolling machine was operated in general as described above and 32 pounds per hour of anhydrous sodium metasilicate (with an average composition of 51% $Na_2O$, 46.5% $SiO_2$ and .5% $H_2O$, with 2% impurities) was uniformly fed on the upper surface of the bottom sheet near the bolster. The top sheet was adjusted to a width that was approximately one inch narrower than the bottom sheet. The rolling speed of the glass sheets was approximately 90 inches per minute. The operation balanced out very quickly and a commercially acceptable product was produced with very high yields.

EXAMPLE 2

Gold color metallic flakes approximately ⅛" in size were fed at a uniform rate and distribution of 50 pounds per hour and excellent yields of a commercially accepted product were produced with the same technique as that described in Example 1.

EXAMPLE 3

A solution of ferric chloride 42° Baumé, 38% $FeCl_3$, was sprayed onto the bottom sheet coincident with the application of the sodium metasilicate. An amber colored sheet was produced.

EXAMPLE 4

Ten percent by weight of rouge ($Fe_3O_4$) was added to sodium metasilicate and the mixture melted, cooled, crushed, and screened. The colored sodium metasilicate thereby produced was fed to the machine in the usual manner. Colored bubbles were produced in the sheet with the clear glass between bubbles.

EXAMPLE 5

20% by weight of Pemco S-1134 Blue frit was ground to a fine powder and mixed with the sodium metasilicate and the mixture fed between the sheets in the usual manner. Elongated specks of blue color were distributed in the bubble layer of the sheet.

EXAMPLE 6

Ten percent by weight of Pemco N-212 Blue pigment ground to a fine powder was intimately mixed with the sodium metasilicate with the amount of colored pigment just sufficient to coat the silicate particles but no excess of loose or unattached pigment was in the mix. This mixture was then fed onto the top sheet as described in Example 1, and a sheet having colored bubbles was produced with clear glass between the bubbles and no specks of color as described in Example 5.

This is an alternate method of obtaining colored bubbles with clear glass in between as described in Example 4 and is the preferred method because it is cheaper.

The intensity of the color produced by coating the silicate particles depends on the amount of pigment that can be attached to the silicate particles and the coloring power of the pigment itself. Some pigments, such as certain yellows or greens, have relatively weak coloring power as compared to a cobalt oxide blue, for example.

To obtain colored bubbles and also more over-all color in the sheet, the following procedure may be followed:

EXAMPLE 7

The silicate particles are coated with finely ground pigments as in Example 6, but 10% by weight of coarsely ground glass frit of the same color is also added to the mix. The coarse particles then produce elongated areas of darker color which are randomly distributed in the sheet and when viewed at a distance of several feet blend together and give more color to the sheet. The intensity of the color can be adjusted to any desired value by adding more or less coarsely ground colored frit and can be made uniform with no separation between the darker color areas if sufficient frit is added.

The particle size of the colored frit must be carefully controlled in this method because if the particles are too fine the rising currents of air from the hot sheet of glass will blow the particles away so very little will reach the bottom sheet and be incorporated between the sheets. We have found that a particle size such that 97.5% is retained on a 50 mesh standard screen is satisfactory.

The screen analysis of the frit was as follows:

| On: | Percent |
|---|---|
| 16 mesh | 18.8 |
| 20 mesh | 34.9 |
| 25 mesh | 16.3 |
| 40 mesh | 22.5 |
| 50 mesh | 5.0 |
| Through 50 | 2.5 |

We claim:
1. The method of forming decorative flat glass which comprises:
  (a) rolling a bottom sheet of glass having a predetermined width along a predetermined path;
  (b) feeding a body of glass between a pair of driven spaced rollers onto the moving bottom sheet to form the top sheet of glass, one of said rollers being in contact with the glass being formed, said body of glass forming a rolling bolster on the bottom sheet in front of said glass contacting the roller;
  (c) applying a decorative material to the upper surface of the bottom sheet near said rolling bolster of molten glass such bolster of molten glass picking up the decorative material from the surface of the bottom sheet and encapsulating it in the glass which is to form the top sheet; and
  (d) rolling the top and bottom sheets between sizing rollers to form the sandwiched flat glass; and
  (e) regulating the width of the top sheet to one which is less than that of said bottom sheet to avoid break origins at the edges of the bottom sheet of glass.

References Cited

UNITED STATES PATENTS 2,758,038  8/1956  Lentz et al. _____ 117—100
2,951,315  9/1960  Cousen et al. _____ 65—60

S. LEON BASHORE, Primary Examiner

J. H. HARMAN, Assistant Examiner

U.S. Cl. X.R.

65—60, 145; 117—124